(12) United States Patent
Choi et al.

(10) Patent No.: US 10,938,031 B2
(45) Date of Patent: Mar. 2, 2021

(54) METAL OXIDE POWDER, METHOD FOR PREPARING SAME, AND LITHIUM SECONDARY BATTERY COMPRISING SAME

(71) Applicant: L&F CO., LTD., Daegu (KR)

(72) Inventors: Su An Choi, Daegu (KR); Ho Jun Jeong, Daegu (KR); Sang Hoon Jeon, Daegu (KR); Ji Woon Yang, Daegu (KR); Jun Ho Shin, Daegu (KR); Jin Seong Jeong, Daegu (KR); Ji Sun An, Daegu (KR)

(73) Assignee: L&F CO., LTD., Daegu (KR)

( * ) Notice: Subject to any disclaimer, the term of this patent is extended or adjusted under 35 U.S.C. 154(b) by 25 days.

(21) Appl. No.: 16/083,795

(22) PCT Filed: Nov. 28, 2016

(86) PCT No.: PCT/KR2016/013761
§ 371 (c)(1),
(2) Date: Sep. 10, 2018

(87) PCT Pub. No.: WO2017/155184
PCT Pub. Date: Sep. 14, 2017

(65) Prior Publication Data
US 2019/0074512 A1    Mar. 7, 2019

(30) Foreign Application Priority Data

Mar. 11, 2016 (KR) .................. 10-2016-0029649

(51) Int. Cl.
| | | |
|---|---|---|
| *H01M 4/13* | (2010.01) | |
| *H01M 4/50* | (2010.01) | |
| *H01M 4/52* | (2010.01) | |
| *C01G 51/00* | (2006.01) | |
| *H01M 4/525* | (2010.01) | |
| *H01M 4/131* | (2010.01) | |
| *H01M 4/505* | (2010.01) | |
| *H01M 10/0525* | (2010.01) | |
| *C01G 53/00* | (2006.01) | |
| *H01M 4/36* | (2006.01) | |
| *H01M 4/58* | (2010.01) | |
| *H01M 4/02* | (2006.01) | |

(52) U.S. Cl.
CPC .......... *H01M 4/525* (2013.01); *C01G 51/50* (2013.01); *C01G 51/66* (2013.01); *C01G 53/50* (2013.01); *H01M 4/131* (2013.01); *H01M 4/366* (2013.01); *H01M 4/505* (2013.01); *H01M 4/5825* (2013.01); *H01M 10/0525* (2013.01); *C01P 2002/52* (2013.01); *C01P 2004/61* (2013.01); *C01P 2004/80* (2013.01); *C01P 2004/84* (2013.01); *C01P 2006/11* (2013.01); *C01P 2006/40* (2013.01); *H01M 2004/028* (2013.01)

(58) Field of Classification Search
CPC ...... H01M 4/131; H01M 4/505; H01M 4/525; C01G 51/50; C01G 51/66
See application file for complete search history.

(56) References Cited

U.S. PATENT DOCUMENTS

| | | | |
|---|---|---|---|
| 2008/0078594 A1* | 4/2008 | Harada ................ | C01G 23/002 429/122 |
| 2011/0059367 A1* | 3/2011 | Morita ................ | C01G 51/006 429/231.95 |
| 2015/0104704 A1* | 4/2015 | Kim ..................... | H01M 4/505 429/217 |

FOREIGN PATENT DOCUMENTS

| | | |
|---|---|---|
| JP | 2015/015169 A | 1/2015 |
| KR | 100914406 B1 | 8/2009 |
| KR | 2010/0052419 A | 5/2010 |
| KR | 2012/0029441 A | 3/2012 |
| KR | 101511935 B1 | 4/2015 |

* cited by examiner

Primary Examiner — Ula C Ruddock
Assistant Examiner — Frank A Chernow
(74) Attorney, Agent, or Firm — Lex Ip Meister, PLLC

(57) ABSTRACT

The present invention relates to a metal oxide powder, a method of preparing the same, and a lithium secondary battery using the same, which comprises:
a metal oxide powder is represented by Formula (1), $$Li_x(M_{1-m-z}A_mD_z)O_t \qquad \text{Formula (1)}$$

in the above Formula (1), $0.85 \leq x \leq 1.2$, $0 \leq m \leq 0.01$, $0 < z \leq 0.04$, $1.85 \leq t \leq 2.2$, M is selected from the group consisting of Ni, Co, Mn and combinations thereof, A is selected from the group consisting of Mg, Ca, Sr, Ba and combinations thereof, D is selected from the group consisting of Ti, Zr, Ce, Ge, Sn and combinations thereof, and E is an average oxidation number of A and D, and $E > 3.5$.

18 Claims, No Drawings

METAL OXIDE POWDER, METHOD FOR PREPARING SAME, AND LITHIUM SECONDARY BATTERY COMPRISING SAME

CROSS-REFERENCE TO RELATED APPLICATIONS

This application is the National Stage of International Application No. PCT/KR2016/013761, filed Nov. 28, 2016, which claims the benefit of Korean Application No. 10-2016-0029649, filed Mar. 11, 2016. The contents of both applications are hereby incorporated by reference in their entirety.

FIELD OF THE INVENTION

A metal oxide powder, a method of preparing the same, and a lithium secondary battery using the same are disclosed.

DESCRIPTION OF THE RELATED ART

In recent times, portable electronic equipment with reduced size and weight has been increasingly used in accordance with development of electronic industries.

Batteries generate electrical power using an electrochemical reaction material for a positive electrode and a negative electrode. Lithium secondary batteries generate electrical energy due to chemical potential changes during intercalation/deintercalation of lithium ions at positive and negative electrodes.

The lithium secondary batteries include a material reversibly intercalating or deintercalating lithium ions during charge and discharge reactions as both positive and negative active materials, and are filled with an organic electrolyte or a polymer electrolyte between the positive and negative electrodes.

A lithium composite metal compound is used as a positive electrode active material of a lithium secondary battery.

In recent years, many efforts have been made to increase the energy density of the positive active material.

In order to increase the bulk density, a method of mixing two types of positive active materials having different particle sizes at a certain ratio is generally used. This is because the small particles fill the pores generated between the large particles to accumulate a large amount of the positive active material in the unit volume.

In order to implement the above method, the implementation of small particles among the particles to be mixed should be given priority. Large particles (usually 5 μm or more) can be crystallized relatively easily by adding Li to promote the grain growth or by increasing the sintering temperature.

However, it is not easy to adjust the particle size to the sintering temperature because the fine particles must have a sintering temperature higher than a certain level for the basic crystallization. In addition, the method of minimizing the Li addition amount is not a good method in terms of high capacity and structural stability. Accordingly, we cannot implement the optimized method.

Due to the limitation of the implementation of such small particles, it is known that up to now, particles having an average particle size D50 of 2 μm can be realized. Implementations to improve the energy density or to maintain stable crystallinity at high voltage by implementing particles at smaller sizes, have not been confirmed yet.

DESCRIPTION OF THE INVENTION

Technical Problem

Disclosed is a metal oxide powder capable of maintaining stability at a high voltage and exhibiting a high rolling density when it is mixed with a large particle size with a particle size of not more than 2 μm, a method for preparing the same, and a lithium secondary battery including the same.

Technical Solution

In an embodiment of the present invention, a metal oxide powder is represented by Formula (1),

Formula (1)

in the above Formula (1), $0.8 \leq x \leq 1.2$, $0 \leq m \leq 0.01$, $0 < z \leq 0.04$, $1.85 \leq t \leq 2.2$, M is selected from the group consisting of Ni, Co, Mn and combinations thereof, A is selected from the group consisting of Mg, Ca, Sr, Ba and combinations thereof, D is selected from the group consisting of Ti, Zr, Ce, Ge, Sn and combinations thereof, and E is an average oxidation number of A and D, and E>3.5.

In addition, the metal oxide powder may include a coating layer formed on at least a part of its surface, the coating layer may include a lithium phosphorus oxide, and the coating layer can further include a composite coating layer having an oxide selected from the group consisting of lithium metal phosphate, metal phosphorus oxide, lithium metal oxide, metal oxide, and combinations thereof.

It may be preferable that A is Mg.
Particularly, A may be Mg, and it may be that $0<m \leq 0.001$.
Further, it may be preferable that D is Ti.
Particularly, it is preferable that D is Ti and $0<z \leq 0.004$.
Further, it is preferable that A is Mg, $0<m \leq 0.001$, D is Ti, and $0<Z \leq 0.004$.

In addition, in the coating layer, the metal contained in lithium phosphate, lithium metal phosphate, metal phosphate, lithium metal oxide, metal oxide and combinations thereof, may be at least one element selected from the group consisting of Mg, Ti, Zr and Ca.

In other embodiment of the present invention, a method of preparing a metal oxide power may include: dry mixing a lithium supply material, a transition metal precursor, a dopant A supply material and a dopant D supply material; sintering the mixture to prepare a metal oxide powder represented by Formula (1) and capable of reversible intercalation and deintercalation of lithium and having an average particle diameter D50 of 2 μm or less; preparing coating material comprising a lithium source, a phosphorus source and a metal source; uniformly adhering a coating material obtained by mixing at least one selected from the group consisting of the lithium source, the phosphorus source and the metal source to the surface of the metal oxide powder; and obtaining a metal oxide powder having a coating layer by sintering the metal oxide powder to which the coating material is adhered, to form a coating layer comprising one element selected from the group consisting of lithium phosphorus oxide, lithium metal phosphate, metal phosphate, lithium metal oxide, metal oxide, and combinations thereof.

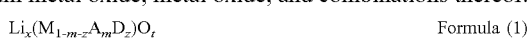

Formula (1)

In the above Formula (1), it may be that $0.8 \leq x \leq 1.2$, $0 \leq m \leq 0.01$, $0<z \leq 0.04$, $1.85 \leq t \leq 2.2$, M is selected from the group consisting of Ni, Co, Mn and combinations thereof, A is selected from the group consisting of Mg, Ca, Sr, Ba and combinations thereof, and D is selected from the group consisting of Ti, Zr, Ce, Ge, Sn and combinations thereof.

E is an average oxidation number of A and D, and it may be E>3.5.

In the sintering step, a temperature may be 750 to 1,050° C.

In the obtaining a metal oxide powder having a coating layer by sintering the metal oxide powder to which the coating material is adhered, a temperature may be 650 to 950° C.

In other embodiment of the present invention, a metal oxide powder is a mixture of a small particle size oxide powder and a large particle size oxide powder, and a mixing ratio of the oxide powders (a small particle size oxide powder:a large particle size oxide powder) is in the range of 50:50 to 10:90.

[A Small Particle Size Oxide Powder]

The small particle size oxide powder may be represented by Formula (1).

Formula (1)

In the above Formula (1), it may be that 0.8≤x≤1.2, 0≤m≤0.01, 0<z≤0.04, and 1.85≤t≤2.2, M is selected from the group consisting of Ni, Co, Mn and combinations thereof, A is selected from the group consisting of Mg, Ca, Sr, Ba and combinations thereof, D is selected from the group consisting of Ti, Zr, Ce, Ge, Sn and combinations thereof, E is an average oxidation number of A and D, E>3.5, and an average particle diameter D50 is of 2 μm or less.

[A Large Particle Size Oxide Powder]

The small particle size oxide powder may be represented by Formula (2).

$Li_{x'}(M'_{1-m'-z'}A'_{m'}D'_{z'})O'_{2-t'}$    Formula (2)

In the above Formula (2), it may be 0.8≤x'≤1.2, 0≤m'≤0.01, 0<z'≤0.01, 0≤t'≤0.01, M' is selected from the group consisting of Ni, Co, Mn and combinations thereof, A' is selected from the group consisting of Mg, Ca, Sr, Ba and combinations thereof, D' is selected from the group consisting of Ti, Zr, Hf, V, Nb, Ta, Cr, Mo, W, Mn, and combinations thereof, and an average particle diameter D50 is of 5 μm or more.

In other embodiment of the present invention, a positive electrode may include the metal oxide powder of the above embodiment of the present invention.

In other embodiment of the present invention, a lithium secondary battery may include a positive electrode including the metal oxide powder of the embodiment of the present invention; a negative electrode including a negative active material; and an electrolyte.

Effects of the Invention

In an embodiment of the present invention, a positive electrode active material for a lithium secondary battery including a metal oxide powder of a very small particle size having an average particle diameter D50 of 2 μm or less can be produced. Thus, the energy density of the positive electrode for a lithium secondary battery can be improved and stable crystallinity can be maintained even at a high voltage.

DETAILED DESCRIPTION OF THE EMBODIMENTS

Hereinafter, embodiments of the present invention are described in detail. However, these embodiments are exemplary, the present invention is not limited thereto and the present invention is defined by the scope of claims.

In an embodiment of the present invention, a metal oxide powder is represented by Formula (1), and obtained by sintering a mixture a lithium supply material, a transition metal precursor, a dopant A supply material and a dopant D supply material. The average particle diameter D50 of the metal oxide powder is preferably 2 μm or less.

Formula (1)

In the above Formula (1), it may be that 0.8≤x≤1.2, 0≤m≤0.01, 0<z≤0.04, and 1.85≤t≤2.2, It may be that M is selected from the group consisting of Ni, Co, Mn and combinations thereof, A is selected from the group consisting of Mg, Ca, Sr, Ba and combinations thereof, and D is selected from the group consisting of Ti, Zr, Ce, Ge, Sn and combinations thereof.

It may be preferable that A is Mg, 0<m≤0.001, D is Ti, and 0<z≤0.004.

The total amount of the dopant can be represented by 0<m+z<0.05.

Also, it is preferable that m<z is satisfied, and 0<m and 0<z are preferable considering battery performance.

In particular, it is preferable that the average oxidation number (E) of dopants A and D is E>3.5.

In this case, the ratio of dopant D, which is mainly tetravalent, and dopant A, which is mainly divalent, are determined on the basis of the oxidation number. When the ratio of dopant D and dopant A are same, E is 3. Accordingly, when E is greater than 3.5, it means that a ratio of dopant D is larger than that of dopant A.

The larger dopant D in the ratio of dopant D and A is related to forming the desired particle size and that the average oxidation number E of the dopant should be greater than 3.5. It means that the lower limit of the battery performance is possible when E is 3.5.

Also, if E is less than 3.5, it means that the desired size cannot be achieved or the desired battery performance cannot be reached.

As described above, the average oxidation number (E) of the dopants A and D is preferably E>3.5, more preferably E>3.6.

On the other hand, in order to miniaturize the positive active material, a small precursor having an average particle diameter D50 of 1 μm or less is basically used. However, by using only a small precursor, the particles cannot be realized as a positive active material proposed in the present invention.

Even if sintering proceeds at a normal temperature of 750 to 1,050° C. (preferably 800 to 1000° C.) for crystallization while using a small precursor, the average particle diameter D50 of the lithium metal oxide powder was varied, depending on the average oxidation number (E) of the ratio of the dopants A and D. For example, when the average number of oxidation (E) of the dopant exceeds 3.5, the average particle size D50 of the particles satisfies 2 μm or less, but when the average number of oxidation (E) of the dopant is 3.5 or less, the average particle size D50 of the particles is greater than 2 μm.

The reason why the average particle diameter D50 of the lithium metal oxide powder varies depending on the average oxidation number (E) of the ratio of the dopants A and D is that the degree of suppression of grain growth is different by precipitates. When a high temperature sintering for crystallization of the positive active material is performed, a compound including a dopant is precipitated in the grain boundaries of the dopant. The precipitate performs as a kind of covering function that suppresses grain growth. The degree of inhibition depends on the type and amount of the element added for inhibition.

Also, it was confirmed that the particle size varies depending on the amount of the dopant D. This indicates that the size of the positive active material is related to the dopant D, and the inhibition of grain growth by the dopant D is related to the amount of the dopant D. Accordingly, the content of the dopant D is preferably 2,000 ppm or more, more preferably 3,000 ppm or more.

The dopant D may be one of Hf, Zr, Ti, and V, but Ti is preferable.

On the other hand, after dopant D is added to achieve grain growth inhibition, dopant A can be added to compensate for the electrochemical performance. It is preferable to add a less amount of dopant A than the dopant D, because dopant A may act to assist grain growth depending on the other element. The content of the dopant A is preferably 500 ppm or less, more preferably 300 ppm or less. The dopant A is an element for supplementing the capacity and efficiency characteristics reduced by an amount for suppressing grain growth, and is preferably Mg, Ca, Sr, or Ba, more preferably Mg.

In addition, due to the miniaturization of the particles, it is possible to expect the effect of reducing the length of the exiting path of Li from the bulk, along with the increase of the surface area where the exchange of Li is directly performed.

Meanwhile, in the metal oxide powder according to an embodiment of the present invention, a coating layer may be formed on at least a part of the surface of the lithium metal oxide powder represented by Formula (1).

The coating layer may include lithium phosphorus oxide. In addition, the coating layer may include a composite coating layer further including an oxide selected from the group consisting of lithium metal phosphate, metal phosphorus oxide, lithium metal oxide, metal oxide, and combinations thereof.

As a result, it is possible to inhibit the oxidative decomposition caused by the reaction with the electrolyte at high voltage and to increase the diffusion of Li ions in the positive active material, thereby improving the movement of Li ions and contributing to improvement of battery characteristics.

In addition, the metal oxide powder according to the present invention is characterized by having a high rolling density due to a bimodal having different average particle diameters as a positive active material for a high voltage of 4.5 V or more.

Specifically, the rolling density of the positive active material may be higher than the rolling density of the positive active material having an average particle size that is not the bimodal form. The rolling density may also be 4.0 to 4.4 g/cc. It can be confirmed that the energy density is remarkably increased compared to the rolling density of the mixed 2 types positive active material having the similar average particle diameter and not being bimodal, which the rolling density is 3.7 to 4.0 g/cc.

Next, a method for manufacturing a metal oxide powder according to an embodiment of the present invention will be described.

First, a lithium supply material, a transition metal precursor (M supply material of Formula (1)), a dopant A supply material and a dopant D supply material are dry mixed. (Mixing step)

At this time, the types and mixing amounts of the lithium supply material, the transition metal precursor, the dopant A supply material, and the dopant D supply material have been described in detail above and will not be described in detail.

The mixture is sintered to prepare a lithium metal oxide powder represented by Formula (1), capable of reversible intercalation and deintercalation of lithium, and having an average particle size D50 of 2 μm or less. (Sintering step)

In the sintering step, the mixture is sintered at a heat treatment temperature of 750 to 1,050° C. (preferably 800 to 1000° C.). Then, a compound represented by Formula (1) is obtained. The lithium metal oxide powder, which is a compound obtained at this time, is capable of reversible intercalation and deintercalation of lithium.

Next, a lithium source, a phosphorus source, and a metal source are prepared to coat the surface of the obtained lithium metal oxide powder. (Preparing a coating material)

When a lithium source, a phosphorus source, and a metal source are prepared, a coating material obtained by mixing at least one selected from these materials is uniformly adhered to the surface of the lithium metal oxide powder. (Adhering Step) At this time, the method of adhering the coating material to the surface is not limited to a specific method but may be implemented in various ways. For example, by dry or wet mixing the obtained lithium metal oxide powder with the coating material.

When the lithium metal oxide powder to which the coating material is adhered is prepared, the lithium metal oxide powder is subjected to heat treatment to form a coating layer having a lithium metal oxide powder, lithium metal oxide, metal phosphate, lithium metal oxide, metal oxide and combinations thereof, on the surface of the lithium metal oxide powder (Coating step).

In the coating step, the coated lithium metal oxide powder may be heat treated at 650 to 950° C. Then, the above-mentioned lithium phosphorus oxide, lithium metal phosphorus oxide, metal phosphorus oxide, lithium metal oxide and metal oxide are coated on the surface of the lithium metal oxide powder in part or in whole.

Meanwhile, the metal oxide powder according to another embodiment of the present invention may be implemented as an oxide powder mixture in which the lithium metal oxide powder (small particle size oxide powder) according to one embodiment described above with a large particle size oxide powder. In this case, the mixing ratio of the oxide powders (small particle size oxide powder:large particle size oxide powder) is preferably 50:50 to 10:90. More preferably, the mixing ratio of the small particle size oxide powder:the large particle size oxide powder is preferably 80:20.

If the proportion of the small particle size oxide powder is smaller than the ratio, the efficiency of accumulating the positive active material is lowered because the ratio of filling the voids between the large particle size oxide powder is too small. If the proportion of the small particle size oxide powder is larger than the ratio, it is caused that small particle size oxide powders are remained after which fill the voids between the large particle size oxide powders.

Since the oxide powder of small particle size is used as the lithium metal oxide powder realized in the embodiment of the present invention described above, detailed description is omitted.

On the other hand, the large particle size oxide powder is represented by the following Formula (2).

$$Li_{x'}(M'_{1-m'-z'}A'_{m'}D'_{z'})O'_{2-t'} \qquad \text{Formula (2)}$$

In the above Formula (2), it may be $0.8 \leq x' \leq 1.2$, $0 \leq m' \leq 0.01$, $0 < z' \leq 0.01$, and $0 \leq t' \leq 0.01$.

In addition, M' is selected from the group consisting of Ni, Co, Mn and combinations thereof, A' is selected from the group consisting of Mg, Ca, Sr, Ba and combinations thereof, D' is selected from the group consisting of Ti, Zr, Hf, V, Nb, Ta, Cr, Mo, W, Mn, and combinations thereof.

At this time, the average particle diameter D50 of the large particle size oxide powder is preferably 5 μm or more.

Another embodiment of the present invention is a lithium secondary battery including a positive electrode, a negative electrode and an electrolyte, wherein the positive electrode includes a current collector and a positive active material layer formed on the current collector, and then the positive active material layer includes the positive active material according to the above embodiment of the present invention.

The description related to the positive active material is omitted because it is the similar as the one and other embodiments of the present invention described above.

The negative electrode and the positive electrode are prepared by mixing an active material, a conductive material and a binder in a solvent to prepare an active material composition, and applying the composition to a current collector. The method of manufacturing such an electrode is well known in the art, and a detailed description thereof will be omitted.

Hereinafter, the present invention will be described with reference to examples and comparative examples of the present invention.

EXAMPLE

Synthesis Example 1 (Small Particle Size 1)

The mixed amount of the transition metal precursor ($Co_3O_4$ having D50 of 1 μm), the lithium supply material ($Li_2CO_3$), the dopant A supply material ($MgCO_3$) and the dopant D supply material ($TiO_2$) was adjusted to be $LiCo_{0.995}Mg_{0.001}Ti_{0.004}O_2$. After that, the mixture was sintered at 800 to 1000° C. for 10 hours to prepare a lithium metal oxide powder.

Then, 100 g of the lithium metal oxide powder was dry mixed with $TiO_2$ powder and $(NH_4)_2HPO_4$ powder to make the coating material adhere to the surface of the lithium metal oxide powder, and then the lithium metal oxide powder with the coating material was heated at 800° C. for 6 hours. And then a positive active material having a composite coating layer containing lithium phosphorous oxide, and further including lithium metal oxides, metal phosphates, lithium metal oxides, metal oxides, or combinations thereof on the surface, was formed.

Synthesis Example 2 (Small Particle Size 2)

$LiCo_{0.995}Mg_{0.001}Ti_{0.004}O_2$ was prepared by controlling the mixing amount of the transition metal precursor, the lithium supply material, the dopant A supply material and the dopant D supply material. After that, the $LiCo_{0.995}Mg_{0.001}Ti_{0.004}O_2$ having a coating layer including $Li_3PO_4$ was prepared by the same sintering and heating method as in Example 1.

Synthesis Example 3 (Small Particle Size 3)

$LiCo_{0.992}Mg_{0.004}Ti_{0.004}O_2$ was prepared by controlling the mixing amount of the transition metal precursor, the lithium supply material, the dopant A supply material and the dopant D supply material. After that, the $LiCo_{0.992}Mg_{0.004}Ti_{0.004}O_2$ having a coating layer including $Li_3PO_4$ was prepared by the same sintering and heating method as in Example 1.

Synthesis Example 4 (Small Particle Size 4)

$LiCo_{0.9998}Mg_{0.0001}Ti_{0.0001}O_2$ was prepared by controlling the mixing amount of the transition metal precursor, the lithium supply material, the dopant A supply material and the dopant D supply material. After that, the $LiCo_{0.9998}Mg_{0.0001}Ti_{0.0001}O_2$ having a coating layer including $Li_3PO_4$ was prepared by the same sintering and heating method as in Example 1.

Synthesis Example 5 (Small Particle Size 5)

$LiCo_{0.995}Mg_{0.004}Ti_{0.001}O_2$ was prepared by controlling the mixing amount of the transition metal precursor, the lithium supply material, the dopant A supply material and the dopant D supply material. After that, the $LiCo_{0.995}Mg_{0.004}Ti_{0.001}O_2$ having a coating layer including $Li_3PO_4$ was prepared by the same sintering and heating method as in Example 1.

Synthesis Example 6 (Small Particle Size 6)

A lithium metal oxide powder, $LiCoO_2$, was prepared by mixing with the dopant A supply material and the dopant D supply material in a controlled manner to adjust the amount of the transition metal precursor ($Co_3O_4$ having a D50 of 1 μm) and the lithium supply material ($Li_2CO_3$), and then sintering the mixture 800 to 1,000° C. for 10 hours. Thereafter, no surface treatment was performed to form a coating layer on the surface of the lithium metal oxide powder.

Synthesis Example 7 (Small Particle Size 7)

The mixed amount of the transition metal precursor ($Co_3O_4$ having D50 of 1 μm), the lithium supply material ($Li_2CO_3$), the dopant A supply material ($MgCO_3$), and the dopant D supply material ($TiO_2$) was adjusted to be $LiCo_{0.995}Mg_{0.001}Ti_{0.004}O_2$. After that, the mixture was sintered at 800 to 1,000° C. for 10 hours to prepare a lithium metal oxide powder. Thereafter, no surface treatment was performed to form a coating layer on the surface of the lithium metal oxide powder.

Synthesis Example 8 (Large Particle Size 1)

The mixed amount of the transition metal precursor ($Co_3O_4$ having D50 of 16 μm), the lithium supply material ($Li_2CO_3$), the dopant A supply material ($MgCO_3$), and the dopant D supply material ($TiO_2$) was adjusted to be $LiCo_{0.9992}Mg_{0.0004}Ti_{0.0004}O_2$. After that, the mixture was sintered at 800 to 1,000° C. for 10 hours to prepare a lithium metal oxide powder. Thereafter, no surface treatment was performed to form a coating layer on the surface of the lithium metal oxide powder.

Then, 100 g of the lithium metal oxide powder was dry mixed with LiOH powder, $TiO_2$ powder and $(NH_4)_2HPO_4$ powder to make the coating material adhere to the surface of the lithium metal oxide powder, and then the lithium metal oxide powder with the coating material was heated at 800° C. for 6 hours. And then a positive active material having a composite coating layer containing lithium phosphorous oxide, and further including lithium metal oxides, metal phosphates, lithium metal oxides, metal oxides, or combinations thereof on the surface, was formed.

The average particle diameter D50 of the positive active material obtained after the heat treatment was 16 μm.

Synthesis Example 9 (Large Particle Size 2)

The nickel composite hydroxide, $Li_2CO_3$, and $MgCO_3$ mixture was dry mixed to make $Li[(Ni_{0.6}Co_{0.2}Mn_{0.2})_{0.999}Zr_{0.001}]O_2$, and the mixture was heat-treated at 800° C. for 12 hours to prepare a positive active material. The average particle diameter D50 of the positive active material obtained after the heat treatment was 10 μm.

Experimental Example 1

The composition, dopant average oxidation number (E), particle size, and adhesion of $Li_3PO_4$ to the surface of the small particle size positive active material prepared in Synthesis Examples 1 to 7 are shown in Table 1 below.

TABLE 1

| | Dopant | | | | | |
|---|---|---|---|---|---|---|
| | A | Mole ratio | D | Mole ratio | E | D50(μm) | Surface treatment |
| Synthesis Example1 | Mg | 0.001 | Ti | 0.004 | 3.6 | 1.0 | ○ |
| Synthesis Example2 | Mg | 0.0001 | Ti | 0.0004 | 3.6 | 1.5 | ○ |
| Synthesis Example3 | Mg | 0.004 | Ti | 0.004 | 3 | 2.1 | ○ |
| Synthesis Example4 | Mg | 0.0001 | Ti | 0.0001 | 3 | 3.0 | ○ |
| Synthesis Example5 | Mg | 0.004 | Ti | 0.001 | 2.4 | 3.6 | ○ |
| Synthesis Example6 | — | — | — | — | — | 2.6 | X |
| Synthesis Example7 | Mg | 0.001 | Ti | 0.004 | 3.6 | 1.1 | X |

It can be seen from Table 1 that the larger the value of the average number of oxidation (E) of the dopant, the smaller the average particle size D50, and the larger the proportion of the dopant D, the smaller the average particle size D50.

Experimental Example 2

As a result of mixing the positive active materials of Synthetic Examples 1 to 9 at a certain ratio, the change of P.D (pellet density) is shown in Table 2 below.

(P.D. was measured under the condition of pressure of 2.5 ton, time: 30 seconds in Carver auto series ne model).

TABLE 2

| | Large particle size | Small particle size | Mixing ratio | P.D (g/cc) |
|---|---|---|---|---|
| Example 1 | Synthesis Example 8 | Synthesis Example 1 | 8:2 | 4.4 |
| Example 2 | Synthesis Example 9 | Synthesis Example 1 | | 4.1 |
| Comparative Exapmle 1 | Synthesis Example 8 | Synthesis Example 3 | | 4.0 |
| Comparative Exapmle 2 | Synthesis Example 8 | Synthesis Example 4 | | 3.9 |
| Comparative Exapmle 3 | Synthesis Example 8 | Synthesis Example 5 | | 3.8 |
| Comparative Exapmle 4 | Synthesis Example 8 | Synthesis Example 7 | | 4.3 |
| Comparative Exapmle 5 | Synthesis Example 9 | Synthesis Example 3 | | 3.8 |

As a result of the experiment, it was confirmed that the smaller particle size of the small particle size, the higher the P.D.

Experimental Example 3 (Evaluation of Battery Characteristics)

Table 3 below shows the 4.5V initial formations, rate characteristics, 1 cycle, 30 cycle capacity, and life characteristic data for the examples and comparative examples in Table 2.

TABLE 3

| | Formation (mAh/g) | 1cycle (mAh/g) | 30cycle (mAh/g) | 30/1cycle (%) | 1 C/0.2 C (%) |
|---|---|---|---|---|---|
| Example 1 | 190 | 183 | 180 | 98.3 | 98 |
| Comparative Example 4 | 186 | 180 | 140 | 77.7 | 95 |

As a result, it was found that the battery characteristics were better than those when the surface treatment was not performed.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

Therefore, the aforementioned embodiments should be understood to be exemplary but not limiting the present invention in any way.

The invention claimed is:

1. A metal oxide powder, wherein the metal oxide powder is represented by Formula (1), $$Li_x(M_{1-m-z}A_mD_z)O_t$$  Formula (1)

wherein, in the above Formula (1), $0.8 \leq x \leq 1.2$, $0 \leq m \leq 0.01$, $0 < z \leq 0.04$, $1.8 \leq t \leq 2.2$, M is selected from the group consisting of Ni, Co, Mn and combinations thereof, A is selected from the group consisting of Mg, Ca, Sr, Ba and combinations thereof, D is selected from the group consisting of Ti, Zr, Ce, Ge, Sn and combinations thereof, and E is an average oxidation number of A and D, and $E > 3.5$.

2. The metal oxide powder of claim 1, wherein, the metal oxide powder comprises a coating layer formed on at least a part of its surface, wherein, the coating layer comprises a lithium phosphorus oxide, wherein, the coating layer further comprises a composite coating layer comprising an oxide selected from the group consisting of lithium metal phosphate, metal phosphorus oxide, lithium metal oxide, metal oxide, and combinations thereof.

3. The metal oxide powder of claim 1, wherein, A is Mg.

4. The metal oxide powder of claim 1, wherein, A is Mg, and $0 < m \leq 0.001$.

5. The metal oxide powder of claim 1, wherein, D is Ti.

6. The metal oxide powder of claim 1, wherein, D is Ti, and $0 < z \leq 0.004$.

7. The metal oxide powder of claim 1, wherein, A is Mg, $0 < m \leq 0.001$, D is Ti, and $0 < z \leq 0.004$.

8. The metal oxide powder of claim 2, wherein, in the coating layer, the metal contained in lithium phosphate, lithium metal phosphate, metal phosphate, lithium metal oxide, metal oxide and combinations thereof, is at least one element selected from the group consisting of Mg, Ti, Zr and Ca.

9. The metal oxide powder of claim 2, wherein, in the coating layer, lithium phosphorus is Li3PO4.

10. A method of preparing a metal oxide power, comprising:

dry mixing a lithium supply material, a transition metal precursor, a dopant A supply material and a dopant D supply material;

sintering the mixture to prepare a metal oxide powder represented by Formula (1) and capable of reversible intercalation and deintercalation of lithium and having an average particle diameter D50 of 2 μm or less;

preparing coating material comprising a lithium source, a phosphorus source and a metal source;

uniformly adhering a coating material obtained by mixing at least one selected from the group consisting of the lithium source, the phosphorus source and the metal source to the surface of the metal oxide powder; and obtaining a metal oxide powder having a coating layer by sintering the metal oxide powder to which the coating material is adhered, to form a coating layer comprising one element selected from the group consisting of lithium phosphorus oxide, lithium metal phosphate, metal phosphate, lithium metal oxide, metal oxide, and combinations thereof, $$Li_x(M_{1-m-z}A_mD_z)O_t \qquad \text{Formula (1)}$$

wherein, in the above Formula (1), 0.8≤x≤1.2, 0≤m≤0.01, 0<z≤0.04, 1.8≤t≤2.2, M is selected from the group consisting of Ni, Co, Mn and combinations thereof, A is selected from the group consisting of Mg, Ca, Sr, Ba and combinations thereof, D is selected from the group consisting of Ti, Zr, Ce, Ge, Sn and combinations thereof, and E is an average oxidation number of A and D, and E>3.5.

11. The method of claim 10, wherein, in the sintering step, a temperature is 750 to 1,050° C.

12. The method of claim 10, wherein, in the obtaining a metal oxide powder having a coating layer by sintering the metal oxide powder to which the coating material is adhered, a temperature is 650 to 950° C.

13. A metal oxide powder, wherein, the metal oxide powder is a mixture of a small particle size oxide powder and a large particle size oxide powder, and a mixing ratio of the oxide powders (a small particle size oxide powder:a large particle size oxide powder) is in the range of 50:50 to 10:90:

[a small particle size oxide powder]

wherein, the small particle size oxide powder is represented by Formula (1)

$$Li_x(M_{1-m-z}A_mD_z)O_t \qquad \text{Formula (1)}$$

wherein, in the above Formula (1), 0.8≤x≤1.2, 0≤m≤0.01, 0<z≤0.04, 1.8≤t≤2.2,

M is selected from the group consisting of Ni, Co, Mn and combinations thereof,

A is selected from the group consisting of Mg, Ca, Sr, Ba and combinations thereof, D is selected from the group consisting of Ti, Zr, Ce, Ge, Sn and combinations thereof, E is an average oxidation number of A and D, and E>3.5, an average particle diameter D50 is of 2 μm or less,

[a large particle size oxide powder]

wherein, the large particle size oxide powder is represented by Formula (2)

$$Li_{x'}(M'_{1-m'-z'}A'_{m'}D'_{z'})O'_{2-t'} \qquad \text{Formula (2)}$$

wherein, in the above Formula (2), 0.8≤x'≤1.2, 0≤m'≤0.01, 0<z'≤0.01, 0≤t'≤0.01,

M' is selected from the group consisting of Ni, Co, Mn and combinations thereof, A' is selected from the group consisting of Mg, Ca, Sr, Ba and combinations thereof, D' is selected from the group consisting of Ti, Zr, Hf, V, Nb, Ta, Cr, Mo, W, Mn, and combinations thereof, an average particle diameter D50 is of 5 μm or more.

14. The metal oxide powder of claim 13, wherein, a P.D of the mixture is 4.1 g/cc or more.

15. A positive electrode, comprising: the metal oxide powder of claim 1.

16. A lithium secondary battery, comprising:

a positive electrode, comprising: the metal oxide powder of claim 1;

a negative electrode comprising a negative active material; and an electrolyte.

17. A positive electrode, comprising: the metal oxide powder of claim 13.

18. A lithium secondary battery, comprising:

a positive electrode, comprising: the metal oxide powder of claim 13;

a negative electrode comprising a negative active material; and an electrolyte.

* * * * *